(12) United States Patent
Fukuda

(10) Patent No.: US 7,918,616 B2
(45) Date of Patent: Apr. 5, 2011

(54) IMAGE SENSING APPARATUS WITH SETTABLE MINIMUM EXPOSURE TIME AND CONTROL METHOD THEREOF

(75) Inventor: Tsuyoshi Fukuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 225 days.

(21) Appl. No.: 12/124,787

(22) Filed: May 21, 2008

(65) Prior Publication Data

US 2008/0304820 A1  Dec. 11, 2008

(30) Foreign Application Priority Data

Jun. 5, 2007  (JP) ................................ 2007-149644

(51) Int. Cl.
*G03B 9/08* (2006.01)
*G03B 7/083* (2006.01)
*G03B 7/093* (2006.01)

(52) U.S. Cl. .......... 396/471; 396/246; 396/71; 348/296; 348/360; 348/362

(58) Field of Classification Search .................. 396/246
See application file for complete search history.

(56) References Cited

U.S. PATENT DOCUMENTS

| 5,280,319 A | 1/1994 | Sato et al. |
| 7,565,068 B2 * | 7/2009 | Endo ............................... 396/52 |
| 2007/0116453 A1 | 5/2007 | Uchiyama |

FOREIGN PATENT DOCUMENTS

| GB | 2229282 A | 9/1990 |
| JP | 11-041523 | 2/1999 |
| WO | 2006-036921 A | 4/2006 |
| WO | 2007-011002 A | 1/2007 |

OTHER PUBLICATIONS

"Entrance Pupil", obtained from http://en.wikipedia.org/wiki/Entrance_pupil on Jul. 2, 2010.*
All of the above reference were cited in a European Search Report (enclosed) mailed on Oct. 14, 2008 in the counterpart European Patent Application 08157682.9.
The above references were cited in a Nov. 20, 2009 European Office Action of which is enclosed, that issued in European Patent Application No. 08157682.9.

* cited by examiner

*Primary Examiner* — W. B. Perkey
*Assistant Examiner* — Bret Adams
(74) *Attorney, Agent, or Firm* — Cowan, Liebowitz & Latman, P.C.

(57) ABSTRACT

An image sensing apparatus comprises an image sensing unit which receives an object image via a lens and accumulate the received image as an electric charge, a mechanical shutter unit which travels so as to shield an image sensing region of the image sensing unit against light, a scanning unit which performs scanning for sequentially starting the accumulation of the electric charge for each image sensing region of the image sensing unit, a control unit which controls the accumulation start scanning of the scanning unit and the travel of a shutter of the mechanical shutter unit, so as to implement a first curtain and second curtain of a shutter and a changing unit which changes a maximum shutter speed on the basis of one of a type of the lens and information on the lens.

8 Claims, 10 Drawing Sheets

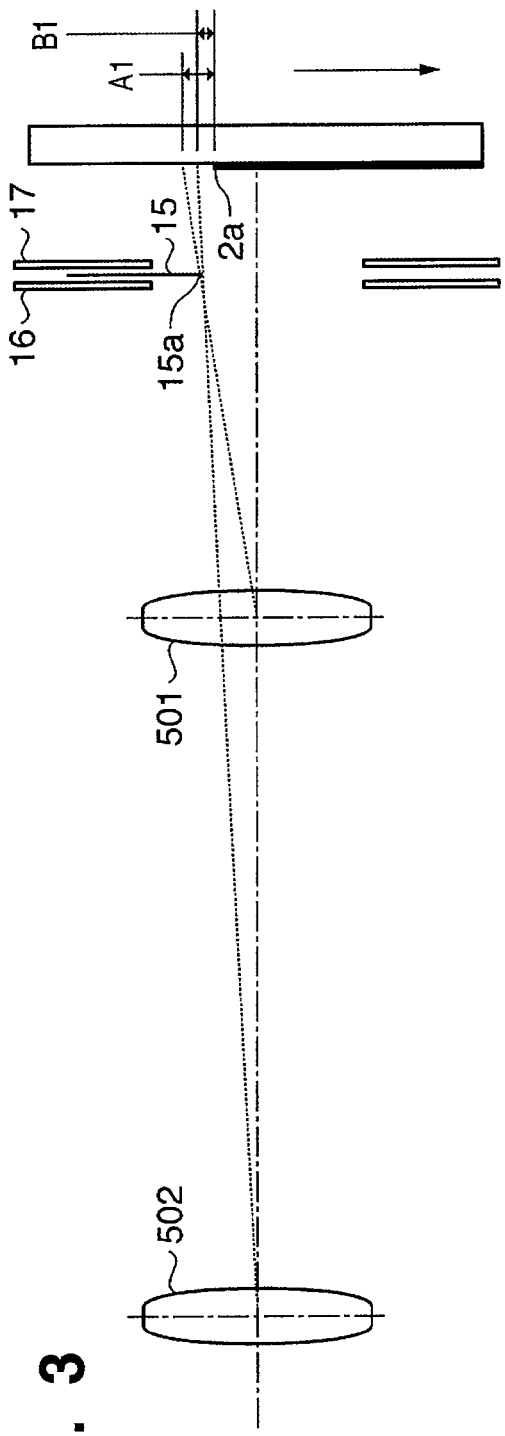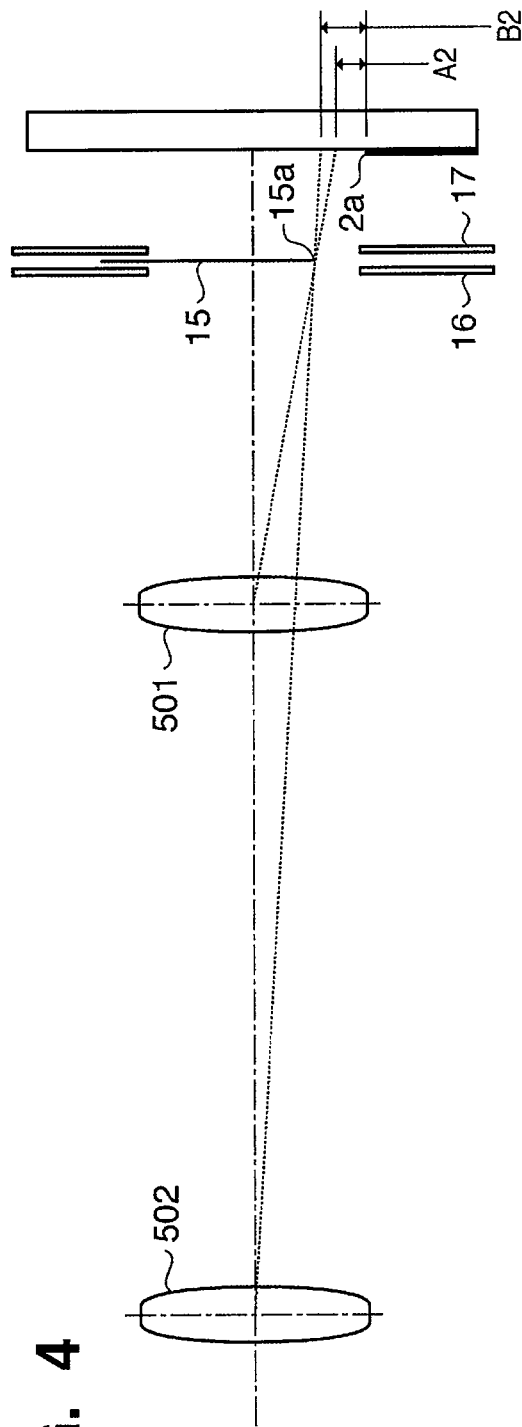
FIG. 3
FIG. 4

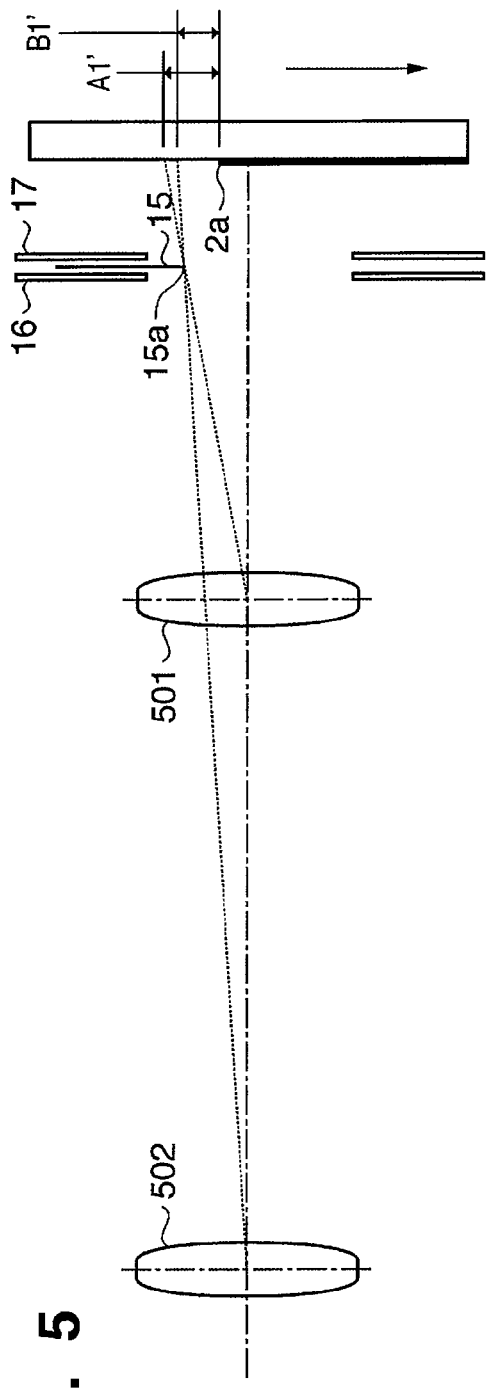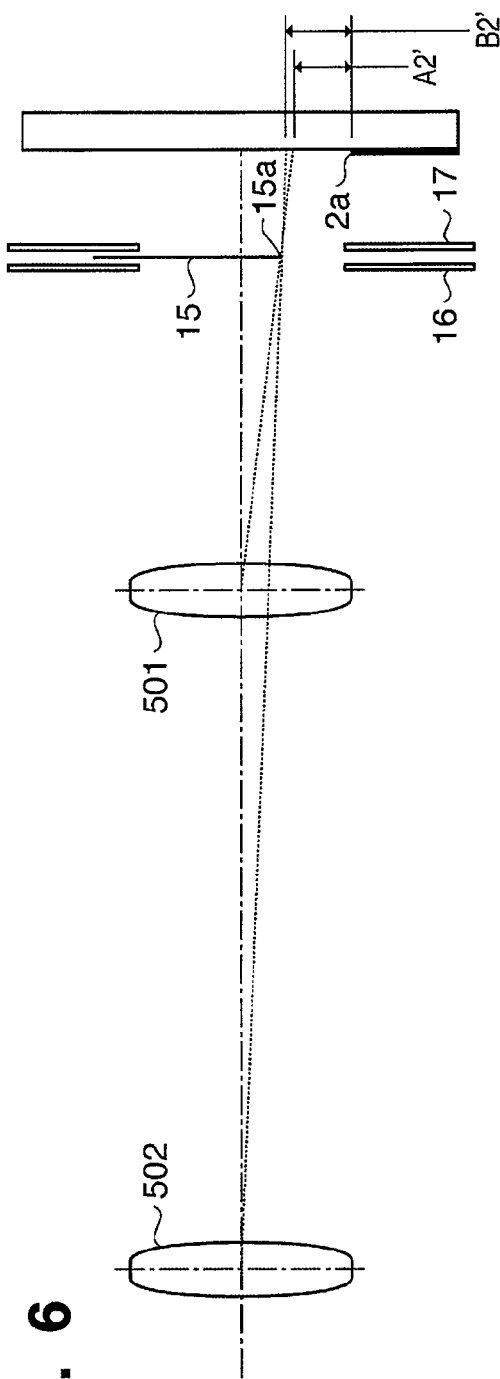

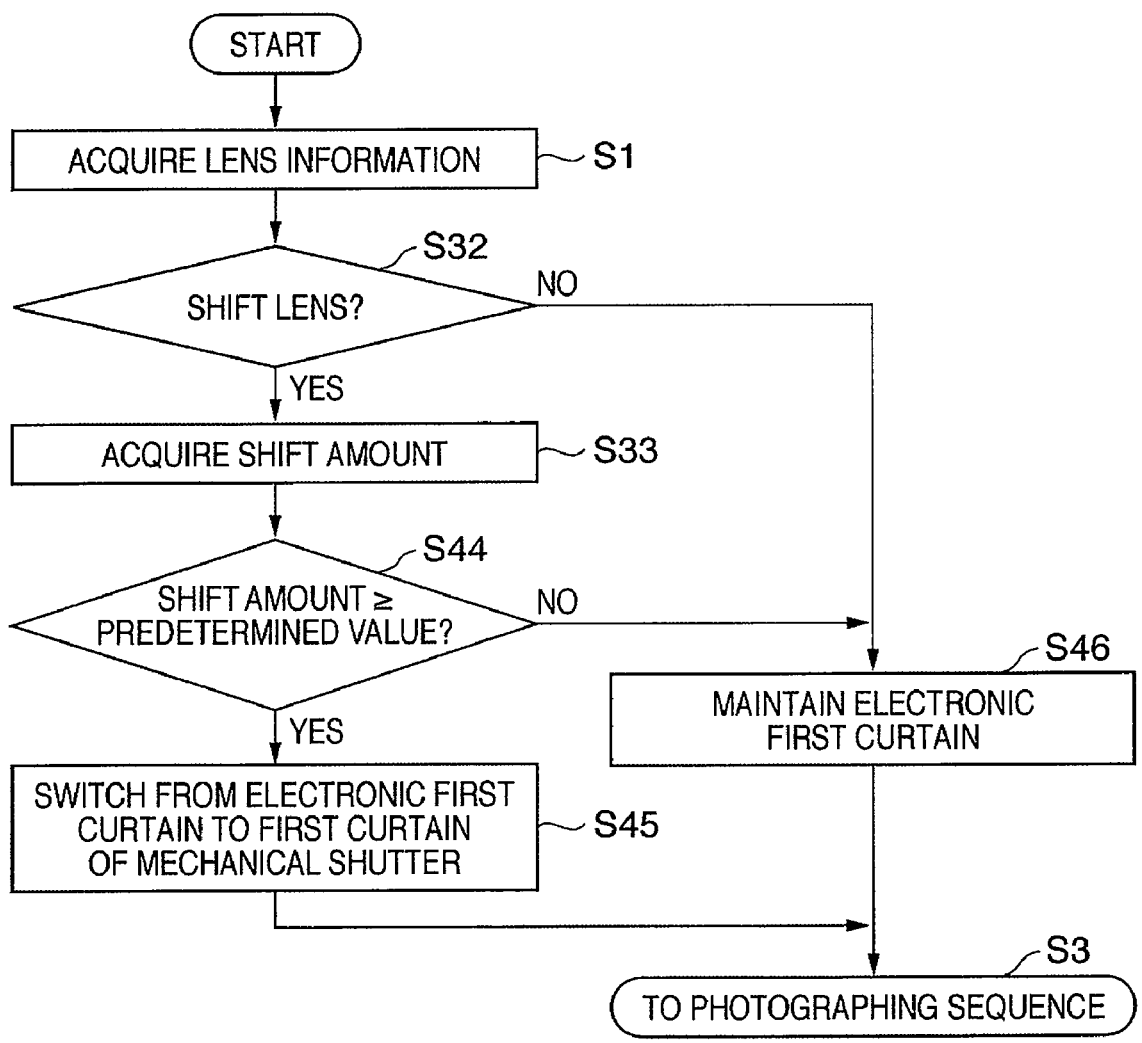

IMAGE SENSING APPARATUS WITH SETTABLE MINIMUM EXPOSURE TIME AND CONTROL METHOD THEREOF

BACKGROUND OF THE INVENTION

1. Field of the Invention

The present invention relates to a photographing control technique which simultaneously uses a mechanical shutter and an electronic shutter.

2. Description of the Related Art

A single-lens reflex digital camera incorporates a mechanical focal plane shutter (to be referred to as a mechanical shutter hereinafter) having a first curtain and a second curtain, and limits the exposure time by movement of the first curtain and second curtain in normal photography. There is also proposed a camera which performs an image sensing operation by simultaneously using a mechanical shutter and an electronic shutter. The mechanism which simultaneously uses a mechanical shutter and an electronic shutter uses the mechanical shutter for the second curtain, and takes a photograph by electric charge accumulation by starting scanning of the pixels of an image sensing element prior to travel of the second curtain.

An image sensing element using a CMOS sensor performs pixel reset (scanning for resetting the accumulated electric charge amount of a pixel to zero) for each pixel or each image sensing region including a plurality of pixels. After a predetermined time has elapsed, signal readout scanning is performed for each pixel or each region, thus implementing an electronic shutter. That is, in such electric charge accumulation of an image sensing element, for each scanning line pixels are reset and electric charge accumulation is started (such electric charge accumulation start scanning will be referred to as reset scanning hereinafter). After that, the second curtain of a mechanical shutter shields the image sensing element against light, and scanning for reading out the electric charges accumulated in the respective pixel elements is performed. Therefore, the pattern of this reset scanning is matched with the traveling characteristic of the mechanical shutter for the second curtain (e.g., Japanese Patent Laid-Open No. 11-41523 (paragraph Nos. 0044 to 0050, FIGS. 1 to 3 and the like)).

A general single-lens reflex digital camera uses an exchangeable photographing lens, and can therefore change the focal length and the exit pupil distance (the distance from the image sensing plane to the lens pupil position). Assume that a mechanical shutter and electronic shutter are simultaneously used. The electronic shutter is activated on the image sensing plane, while the mechanical shutter is spaced apart from the image sensing plane in the optical axis direction. For this reason, the light-shielding position, on the image sensing plane, of the mechanical shutter changes depending on, for example, the focal length and exit pupil distance. Particularly when the time from reset scanning until light shielding by the mechanical shutter is relatively short, unevenness of exposure occurs in the shutter scanning direction depending on the conditions of the photographing lens.

Examples of the conditions of the photographing lens are the presence/absence of pupil position information, whether the lens is a shift lens, the shift amounts of a shift lens and antivibration lens, whether the lens has an accessory adapter for changing the pupil position, and whether an extension tube is attached to the lens. Since the light-shielding position, on the image sensing plane, of the second curtain of the mechanical shutter changes depending on these factors, unevenness of exposure occurs in the shutter scanning direction as described above.

SUMMARY OF THE INVENTION

The present invention has been made in consideration of the above-described problem, and has as its object to provide a technique capable of reducing unevenness of exposure in the shutter scanning direction attributed to the lens conditions when a mechanical shutter and electronic shutter are used together.

In order to solve the above-described problem, according to the present invention in its first aspect, there is provided an image sensing apparatus comprising: an image sensing unit having one or more image sensing regions adapted to receive an object image via the lens and accumulate the received image as an electric charge; a mechanical shutter adapted to travel so as to shield the one or more image sensing regions against light; a scanning unit adapted to perform scanning for sequentially starting the accumulation of the electric charge for each one or more image sensing regions of the image sensing unit; a controller adapted to control the scanning of the scanning unit and the mechanical shutter, so as to provide an electronic first curtain and mechanical second curtain; and a changing unit adapted to change the maximum shutter speed on the basis of at least one of: the type of the lens and information on the lens.

According to the present invention in its second aspect, there is also provided an image sensing apparatus comprising: an image sensing unit having one or more image sensing regions adapted to receive an object image via the lens and accumulate the received image as an electric charge; a mechanical shutter which includes a first curtain and second curtain adapted to travel so as to shield the one or more image sensing regions against light; a scanning unit adapted to perform scanning for sequentially starting the accumulation of the electric charge for each one or more image sensing region of the image sensing unit; a controller adapted to control the scanning for starting the accumulation of the electric charge and the travel of the mechanical shutter, so as to implement a first curtain and second curtain of a shutter; and a switching unit adapted to switch the first curtain of the shutter from an electronic first curtain to the first curtain of the mechanical shutter on the basis of at least one of: the type of the lens and information on the lens.

According to the present invention in its third aspect, there is also provided a control method for an image sensing apparatus which comprises: an image sensing unit adapted to receive an object image via a lens and accumulate the received image as an electric charge; a mechanical shutter unit adapted to travel so as to shield an image sensing region of the image sensing unit against light; a scanning unit adapted to perform scanning for sequentially starting the accumulation of the electric charge for each image sensing region of the image sensing unit; and a control unit adapted to control the accumulation start scanning of the scanning unit and the travel of a shutter of the mechanical shutter unit, so as to implement a first curtain and second curtain of a shutter, the method comprising: changing a maximum shutter speed on the basis of at least one of: the type of the lens and information on the lens.

According to the present invention in its fourth aspect, there is also provided a control method for an image sensing apparatus which comprises: an image sensing unit adapted to receive an object image via a lens and accumulate the received image as an electric charge; a mechanical shutter unit which includes a first curtain and second curtain and is adapted to travel so as to shield an image sensing region of the image sensing unit against light; a scanning unit adapted to perform scanning for sequentially starting the accumulation of the electric charge for each image sensing region of the image sensing unit; and a control unit adapted to control the scanning for starting the accumulation of the electric charge and the travel of the mechanical shutter unit, so as to implement a first curtain and second curtain of a shutter, the method comprising: switching the first curtain of the shutter from an electronic first curtain to the first curtain of the mechanical shutter unit on the basis of at least one of: the type of the lens and information on the lens.

According to the present invention, it is possible to attain a technique for reducing unevenness of exposure in the shutter scanning direction attributed to the lens conditions when a mechanical shutter and electronic shutter are simultaneously used.

Further features of the present invention will become apparent from the following description of exemplary embodiments (with reference to the attached drawings).

BRIEF DESCRIPTION OF THE DRAWINGS

FIG. 3 is a view showing the relationship among a mechanical second curtain, an electronic first curtain, and the pupil position of a photographing lens;
FIG. 4 is a view showing another relationship among the mechanical second curtain, the electronic first curtain, and the pupil position of the photographing lens;
FIG. 5 is a view showing still another relationship among the mechanical second curtain, the electronic first curtain, and the pupil position of the photographing lens;
FIG. 6 is a view showing still another relationship among the mechanical second curtain, the electronic first curtain, and the pupil position of the photographing lens;
FIG. 14 is a flowchart illustrating shutter switching processing corresponding to the lens conditions according to the fourth embodiment.

DESCRIPTION OF THE EMBODIMENTS

The present invention will now be described in detail with reference to the accompanying drawings.

Embodiments to be described hereinafter are implementation examples of the present invention, and can be appropriately modified or changed in accordance with various conditions and the arrangement of an apparatus to which the present invention is applied. Therefore, the present invention is not particularly limited to the following embodiments.

[Arrangement of Image Sensing Apparatus (FIG. 1)]

Figure 1:
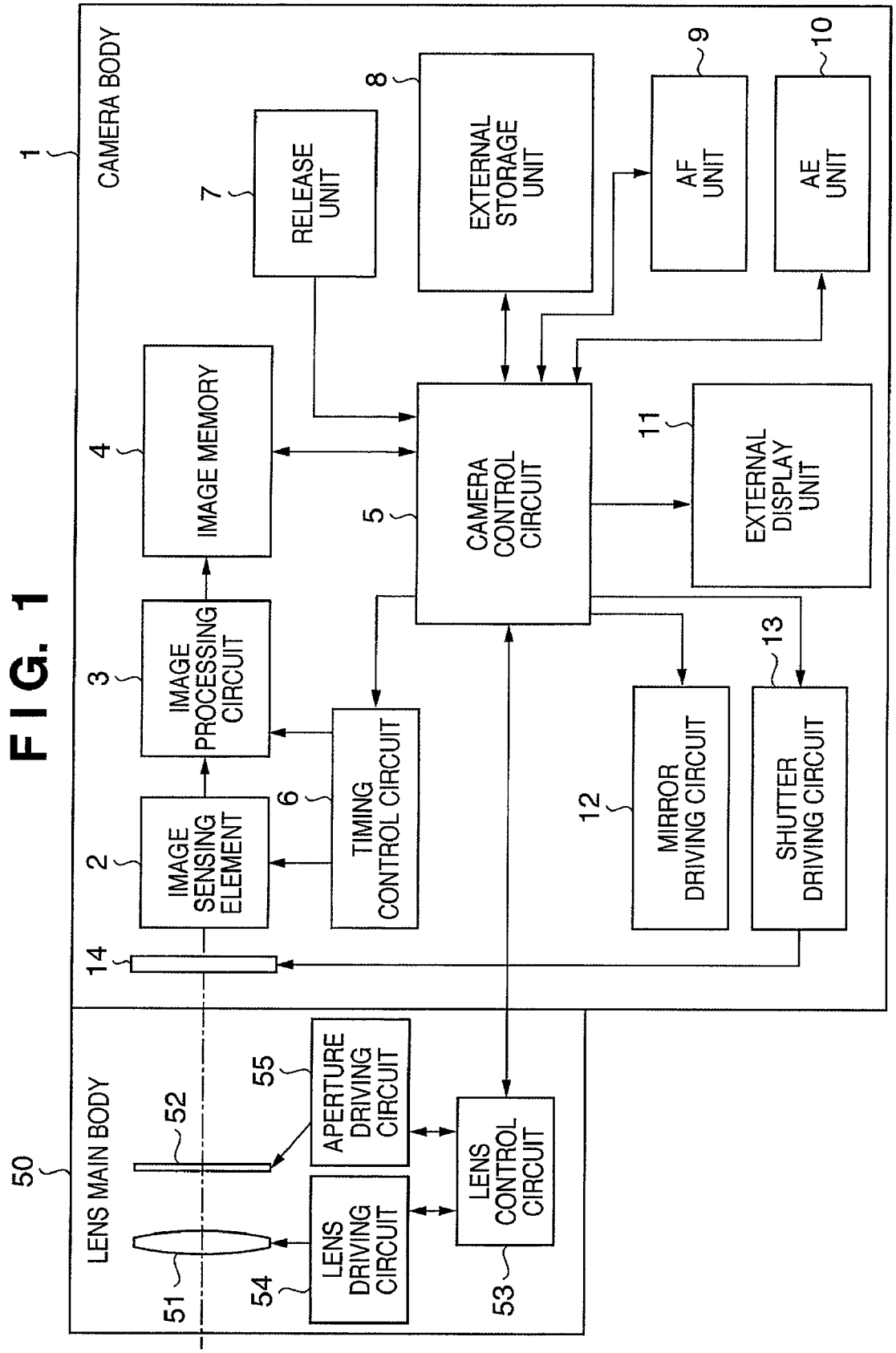
FIG. 1 is a block diagram showing an image sensing apparatus according to an embodiment of the present invention.

FIG. 1 is a block diagram showing an image sensing apparatus according to an embodiment of the present invention.

Referring to FIG. 1, the image sensing apparatus according to this embodiment is, for example, a digital still camera. Reference numeral 1 denotes a camera body.

An image sensing element 2 includes, for example, a CMOS sensor and receives and photoelectrically converts an optical image of an object.

An image processing circuit 3 performs predetermined pixel interpolation processing and color conversion processing for an electric charge signal from the image sensing element 2 or data from an image memory 4. Using the sensed image data, the image processing circuit 3 performs predetermined arithmetic processing and even TTL AWB (Auto White Balance) processing based on the obtained arithmetic result.

The data from the image processing circuit 3 is written into the image memory 4.

A camera control circuit 5 includes an arithmetic processing circuit such as a CPU and controls the overall camera body 1.

A timing generation circuit 6 supplies a clock signal and control signal to the image sensing element 2 and image processing circuit 3.

A release unit 7 performs the release operation of a shutter 14. When a shutter button (not shown) is operated midway (pressed halfway), a switch SW1 of the release unit 7 is turned on so that the camera control circuit 5 issues an instruction to start, for example, AF (Auto Focus) processing or AE (Auto Exposure) processing. When the shutter button (not shown) is operated completely (pressed fully), a switch SW2 of the release unit 7 is turned on so that an electric charge signal read out from the image sensing element 2 is output to the image processing circuit 3.

An external storage unit 8 such as a hard disk stores photographed image data, and has a storage capacity large enough to store a predetermined number of still images and a moving image for a predetermined time.

An AF unit 9 adjusts the focus position from focal length information.

An AE unit 10 performs exposure adjustment from photometric information of an object.

An external display unit 11 includes, for example, a liquid crystal display panel and displays, for example, the apparatus operation state or a message using, for example, a text, image, or sound in accordance with program execution by the camera control circuit 5.

A mirror driving circuit 12 moves up or down a mirror which is obliquely inserted in the photographing optical path in a viewfinder observation state and retracted outside the photographing optical path in a photographing state.

A shutter driving circuit 13 drives the shutter 14.

The mechanical shutter 14 has a first curtain and second curtain and controls a light beam which enters the image sensing element 2 from a lens main body 50, and performs an image sensing operation by simultaneously using an electronic shutter and the second curtain of the shutter 14 in normal photography. That is, an electronic first curtain and mechanical second curtain are implemented by controlling reset scanning of the image sensing element 2 and travel of the second curtain of the mechanical shutter 14. In switching from the electronic first curtain to the first curtain of the mechanical shutter 14 (to be described later), the first curtain and second curtain of the mechanical shutter 14 limit the exposure time.

The lens main body 50 is detachably, electrically connected to the camera body 1 via a connector including a communication line and power supply line.

A photographing lens 51 includes focus lenses and zoom lenses. Although these lenses are illustrated as one lens in FIG. 1 for the sake of convenience, they are formed by complicated combinations of a large number of lenses in practice.

An aperture 52 adjusts the light amount in photography.

A lens control circuit 53 includes an arithmetic processing circuit such as a CPU, controls, for example, focus driving and aperture driving (to be described later), and communicates with the camera control circuit 5.

A lens driving circuit 54 drives the photographing lens in the optical axis direction based on a command from the lens control circuit 53.

An aperture driving circuit 55 drives the aperture 52 based on a command from the lens control circuit 53.

[Photographing Operation (FIG. 1)]

The operations of the camera body 1 and lens main body 50 will be explained next with reference to FIG. 1.

When the switch SW1 of the release unit 7 is turned on, the camera control circuit 5 outputs an AF processing instruction to the AF unit 9, and outputs an AE processing instruction to the AE unit 10.

The AF unit 9 determines the current defocus state. The camera control circuit 5 calculates focal length information from the defocus state, and outputs this information to the lens control circuit 53 of the lens main body 50. Based on the focal length information obtained by the camera control circuit 5, the lens control circuit 53 outputs a control command to the lens driving circuit 54 to drive and focus the photographing lens 51.

The AE unit 10 measures the current brightness of an object. The camera control circuit 5 calculates photometric information from the photometric result, and determines the exposure time and F-number according to the camera setting.

After the AF processing and AE processing are completed and the switch SW2 of the release unit 7 is turned on, the camera control circuit 5 outputs a control command to the lens control circuit 53. The aperture driving circuit 55 drives the aperture 52 to have a predetermined F-number, in accordance with the command from the lens control circuit 53.

The camera control circuit 5 outputs a control command to the mirror driving circuit 12 to move a mirror (not shown) from a viewfinder observation state to a photographing state.

The camera control circuit 5 outputs control commands to the shutter driving circuit 13 and timing generation circuit 6. Image sensing is performed by implementing an electronic first curtain and mechanical second curtain by controlling electric charge accumulation start scanning of the image sensing element 2 and travel of the mechanical shutter 14.

The electric charges accumulated in the image sensing element 2 are sequentially read out to the image processing circuit 3 and undergo image processing by it. The processed image data is written into the image memory 4.

The image data temporarily stored in the image memory 4 are transferred to the external storage unit 8 and recorded in it.

[Operations of Electronic First Curtain and Mechanical Second Curtain]

Figure 2:
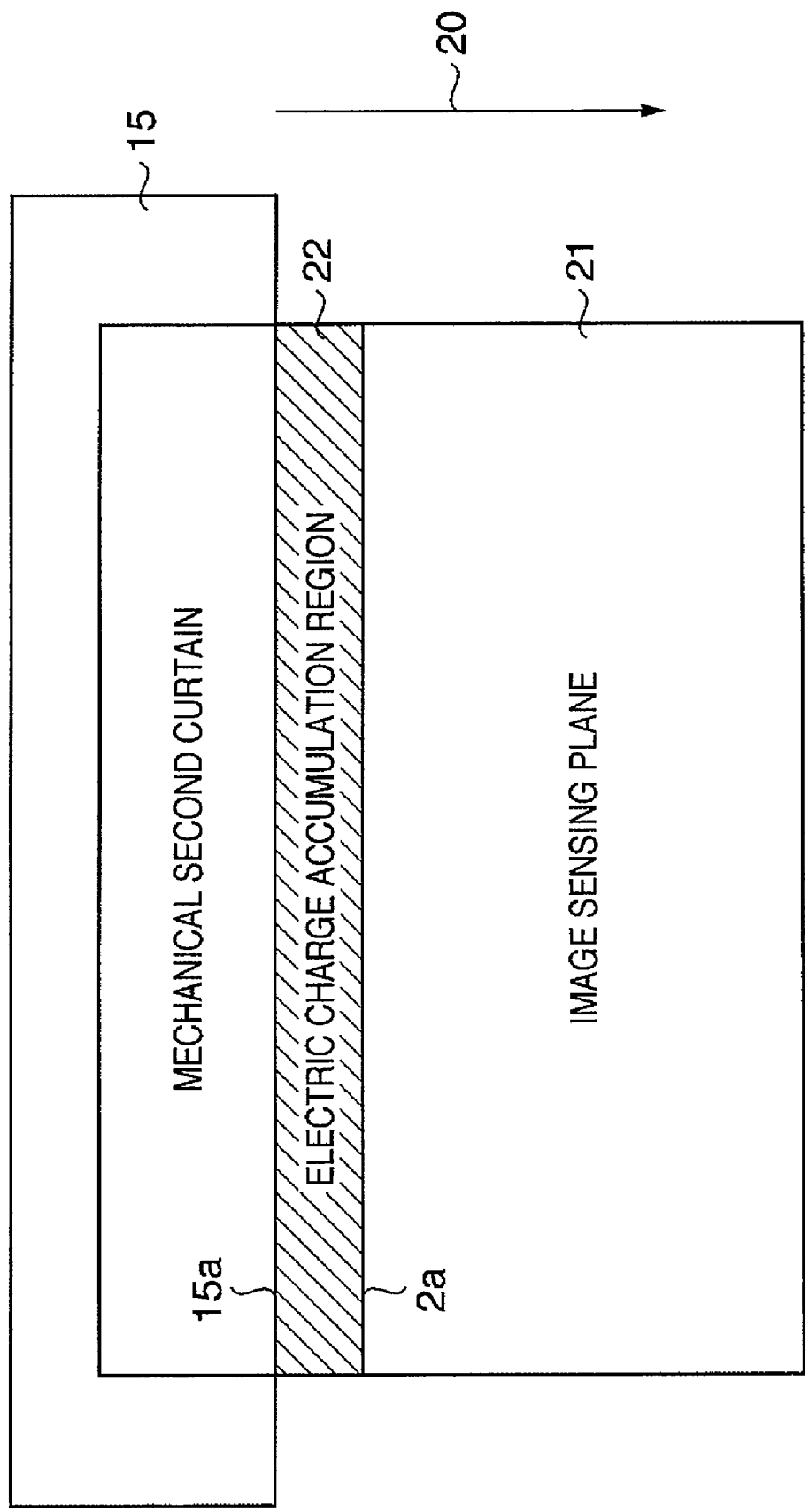
FIG. 2 is a view of an image sensing element and the second curtain of a mechanical shutter when seen from the lens side along the optical axis direction.

FIG. 2 is a view of the image sensing element and the second curtain of the mechanical shutter when seen from the lens side along the optical axis direction. FIG. 2 shows reset scanning of the electronic first curtain and travel of the mechanical second curtain after photography is started by the release unit 7.

Referring to FIG. 2, an arrow 20 indicates both the reset scanning direction (the traveling direction of the electronic first curtain) of the electronic first curtain and the traveling direction of the mechanical second curtain. An object image is formed on the image sensing plane of the image sensing element 2 via the lens main body 50. Reference numeral 21 indicates the image sensing plane of the image sensing element 2; and 15, the mechanical second curtain of the mechanical shutter 14. FIG. 2 shows the state in which the mechanical second curtain 15 partially shields the image sensing plane 21 against light. Reference numeral 2a indicates a line (reset line) along which reset scanning of the image sensing element 2 is performed.

The reset scanning is to reset the amounts of accumulated electric charge of pixels on the reset line 2a to zero, and the reset line 2a corresponds to the leading edge of the electronic first curtain.

A slit region 22 between the reset line 2a and a leading edge portion 15a of the mechanical second curtain 15 is an image sensing region (electric charge accumulation region) in which the image sensing element 2 accumulates electric charges by exposure. As the electronic first curtain and mechanical second curtain travel, the electric charge accumulation region 22 moves in the direction indicated by the arrow 20. The time from when the reset line 2a passes through a given pixel of the image sensing element 2, that is, from when reset scanning is started until the mechanical second curtain 15 shields the image sensing element 2 against light is the time for electric charge accumulation of the given pixel by exposure. Since the reset line 2a travels in the direction indicated by the arrow 20 and electric charge accumulation on each line starts, the electric charge accumulation start timing changes for each line of the image sensing element 2.

[Relationship Between Pupil Position and Exposure Time]

The reason why the exposure time changes depending on the pupil position of the lens main body 50 will be explained next with reference to FIGS. 3 and 4.

FIGS. 3 and 4 are views each showing the relationship among the mechanical second curtain, the electronic first curtain, and the pupil position of the photographing lens.

Referring to FIGS. 3 and 4, reference numeral 502 denotes a lens having a long focal length and long exit pupil distance; 501, a lens having a short focal length and short exit pupil distance; 16, a shutter base plate; and 17, a shutter blade press.

FIG. 3 shows the state in which the shutter has begun to open with a maximum speed in a photographing operation. A slit width A1 indicates the width of a region formed between the reset line 2a and a line 15a on which the mechanical second curtain 15 shields a light beam from the lens 501 with a short exit pupil distance. A slit width B1 indicates the width of a region formed between the reset line 2a and the line 15a on which the mechanical second curtain 15 shields a light beam from the lens 502 with a long exit pupil distance.

At the timing shown in FIG. 3, the slit width A1 is wider than the slit width B1. When the electronic first curtain and mechanical second curtain are driven under the same conditions, exposure using the lens 501 takes a longer time than exposure using the lens 502 in the region with the slit width B1. Therefore, if the reset scanning pattern of the electronic first curtain is set such that the lens 501 can obtain correct exposure, underexposure occurs at the beginning of opening of the shutter upon photography by the lens 502.

FIG. 4 shows the latter half of a photographing operation (near the end of photography). A slit width A2 indicates the width of a region formed between the reset line 2a and the line 15a on which the mechanical second curtain 15 shields a light beam from the lens 501 with a short focal length and short exit pupil distance. A slit width B2 indicates the width of a region formed between the reset line 2a and the line 15a on which the mechanical second curtain 15 shields a light beam from the lens 502 with a long focal length and long exit pupil distance.

At the timing shown in FIG. 4, the slit width B2 is wider than the slit width A2 in contrast to the beginning of opening of the shutter shown in FIG. 3. When the electronic first curtain and mechanical second curtain are driven under the same conditions, exposure using the lens 501 takes a longer time than exposure using the lens 502 in the region with the slit width A2. Therefore, if the reset scanning pattern of the electronic first curtain is set such that the lens 501 can obtain correct exposure, overexposure occurs upon photography by the lens 502.

For the above-described reason, an optimal reset scanning timing of the electronic first curtain changes depending on the difference in pupil position.

A case in which the exposure time is prolonged, that is, the shutter speed is slowed down to reduce the above-described unevenness of exposure will be explained with reference to FIGS. 5 and 6.

The same reference numerals as in FIGS. 3 and 4 denote the corresponding members in FIGS. 5 and 6.

Referring to FIG. 5, a slit width A1' corresponding to a lens 501 with a short exit pupil distance is about twice the slit width A1 shown in FIG. 3. A slit width B1' corresponding to a lens 502 with a long exit pupil distance is shorter than the slit width A1', but the difference between the slit widths A1' and B1' is very small as compared with that between the slit widths A1 and B1 shown in FIG. 3.

Likewise, referring to FIG. 6, a slit width A2' corresponding to a lens 501 with a short exit pupil distance is about twice the slit width A2 shown in FIG. 4. A slit width B2' corresponding to a lens 502 with a long exit pupil distance is shorter than the slit width A2', but the difference between the slit widths A2' and B2' is very small as compared with that between the slit widths A2 and B2 shown in FIG. 4.

Slowing down the shutter speed reduces unevenness of exposure due to the difference in pupil position. In addition, the amount of error with respect to the shutter speed decreases in proportion. That is, the amount of error decreases to ½ if the maximum shutter speed is halved, and it decreases to ¼ if the maximum shutter speed is halved again.

FIGS. 3 and 4 show the state in which the shutter speed is a maximum. Slowing down the shutter speed from the maximum one by two steps makes it possible to eliminate errors of the pupil positions of nearly all the lenses. This is because when the shutter speed slows down to below about 1/2000 seconds, the difference in slit width attributed to the pupil position of each lens becomes negligibly small.

OPERATION SEQUENCE

First Embodiment

Maximum shutter speed changing processing corresponding to the lens conditions according to the first embodiment will be explained with reference to the sequence illustrated in FIG. 7.

Figure 7:
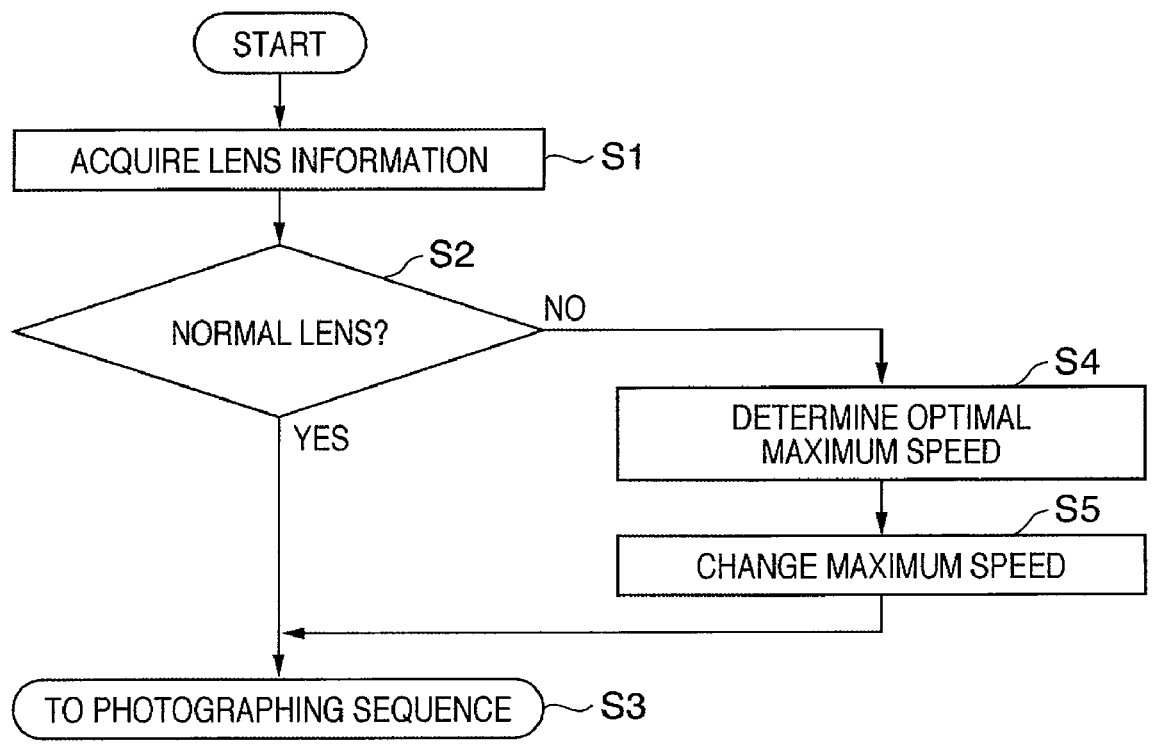
FIG. 7 is a flowchart illustrating exposure time changing processing corresponding to the lens conditions according to the first embodiment.

Referring to FIG. 7, when the processing starts, a camera control circuit 5 acquires information associated with a lens from a lens main body 50 (S1). The camera control circuit 5 communicates with a lens control circuit 53 of the lens main body 50 to transmit/receive necessary information on the lens main body 50 mounted on a camera body 1 to/from the lens control circuit 53.

The camera control circuit 5 determines the lens conditions from the lens information acquired in step S1 (S2). If the camera control circuit 5 determines in step S2 that the lens main body 50 is a normal lens, the processing shifts to a photographing sequence (S3). Then, the camera control circuit 5 sets an optimal traveling characteristic of an electronic first curtain in accordance with the lens information acquired in step S1.

If the camera control circuit 5 determines in step S2 that information associated with the lens pupil position is absent or is not found, an optimal traveling characteristic of the electronic first curtain cannot be obtained and an optimal maximum shutter speed is set for all the lenses (S4). More specifically, the maximum shutter speed is slowed down by about two steps. That is, if the maximum shutter speed is 1/8000 seconds, it is slowed down to about 1/2000 seconds. This makes it possible to obtain an appropriate image with low unevenness of exposure, as described with reference to FIGS. 5 and 6.

The camera control circuit 5 changes the setting value of the maximum speed to the one determined in step S4, and the processing shifts to the photographing sequence (S3).

The determination in step S2 may be done in accordance with the presence/absence of a device to change the lens pupil position or the presence/absence of an extension tube, in addition to the presence/absence of information associated with the lens pupil position.

More specifically, if a device to change the lens pupil position or an extension tube is absent, a predetermined shutter speed is set as the maximum shutter speed.

OPERATION SEQUENCE

Second Embodiment

Shutter switching processing corresponding to the lens conditions according to the second embodiment will be explained next with reference to the sequence illustrated in FIG. 8.

Figure 8:
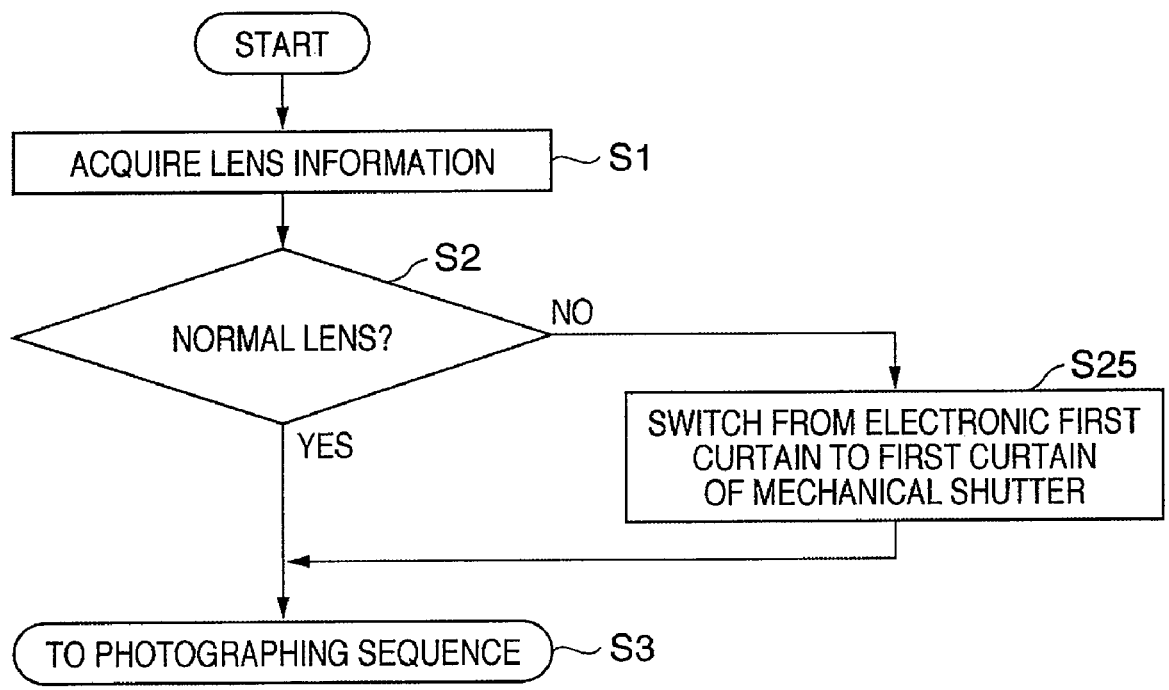
FIG. 8 is a flowchart illustrating shutter switching processing corresponding to the lens conditions according to the second embodiment.

The same reference signs as in FIG. 7 denote the corresponding processing operations in FIG. 8.

The second embodiment is different from the first embodiment in that if a camera control circuit 5 determines in step S2 that a lens main body 50 is not a normal lens, switching is performed from an electronic first curtain to the first curtain of a mechanical shutter in step S25. This makes it possible to obtain an image with correct exposure because the mechanical shutter has no error compared with the electronic first curtain.

[Relationship Between Exposure Time and Shift Amount of Shift Lens]

The reason why the exposure time changes depending on the amount of shift of a shift lens will be explained next with reference to FIGS. 9 and 10.

Figure 9:
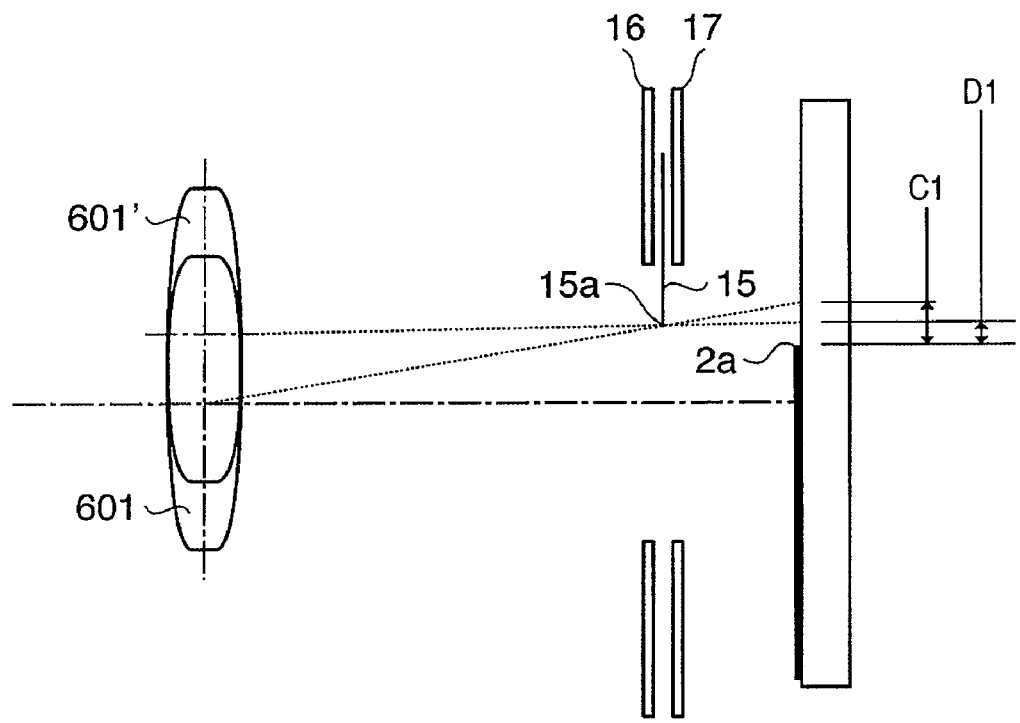
FIG. 9 is a view showing the relationship among a mechanical second curtain, an electronic first curtain, and the amount of shift of a shift lens.
Figure 10:
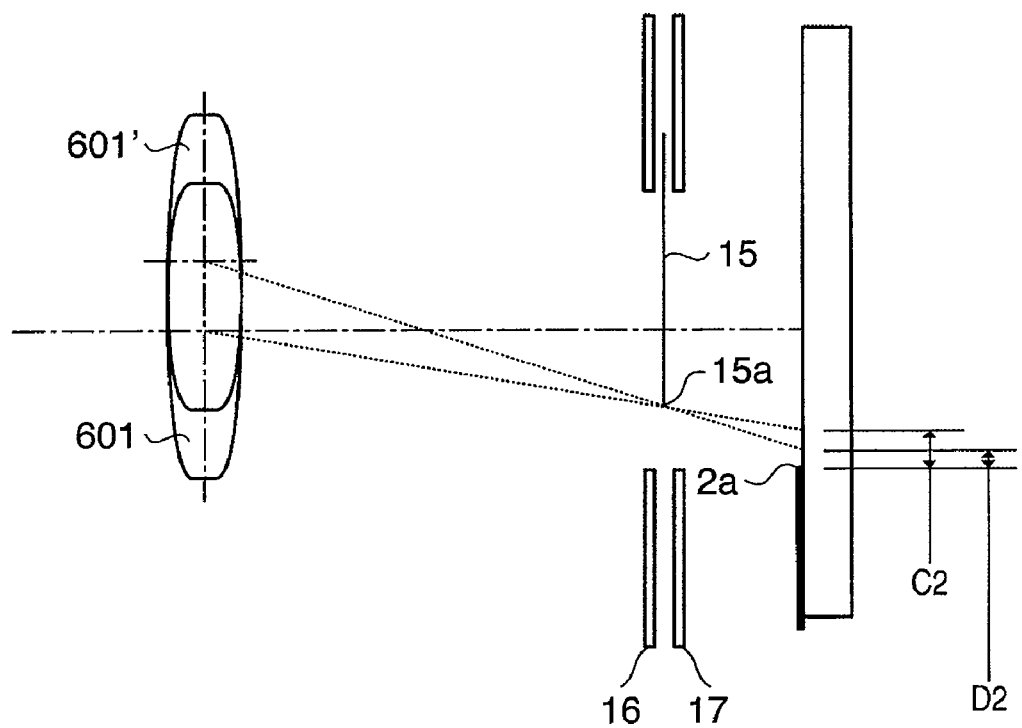
FIG. 10 is a view showing another relationship among the mechanical second curtain, the electronic first curtain, and the amount of shift of the shift lens.

FIGS. 9 and 10 are views each showing the relationship between the mechanical second curtain, the electronic first curtain, and the amount of shift of the shift lens. The same reference numerals as in FIGS. 3 and 4 denote corresponding members in FIGS. 9 and 10.

Referring to FIGS. 9 and 10, reference numeral 601 indicates the state in which a shift lens has not shifted; and 601', the state in which a shift lens has largely shifted.

FIG. 9 shows the state in which the shutter has begun to open with a maximum speed in a photographing operation. A slit width C1 indicates the width of a region formed between a reset line 2a and a line 15a on which a mechanical second curtain 15 shields a light beam from the lens 601 with zero amount of shift. A slit width D1 indicates the width of a region formed between the reset line 2a and the line 15a on which the mechanical second curtain 15 shields a light beam from the lens 601' with a large amount of shift.

At the timing shown in FIG. 9, the slit width C1 is wider than the slit width D1. When the electronic first curtain and mechanical second curtain are driven under the same conditions, exposure using the lens 601 with zero amount of shift takes a longer time than exposure using the lens 601' with a large amount of shift in the region with the slit width D1. Therefore, if the reset scanning pattern of the electronic first curtain is set such that the lens 601 with zero amount of shift can obtain correct exposure, underexposure occurs at the beginning of opening of the shutter upon photography by the lens 601'.

FIG. 10 shows the latter half of a photographing operation (near the end of photography). A slit width C2 indicates the width of a region formed between the reset line 2a and the line 15a on which the mechanical second curtain 15 shields a light beam from the lens 601 with zero amount of shift. A slit width D2 indicates the width of a region formed between the reset line 2a and the line 15a on which the mechanical second curtain 15 shields a light beam from the lens 601' with a large amount of shift.

At the timing shown in FIG. 10, the slit width D2 is shorter than the slit width C2 as in the beginning of opening of the shutter shown in FIG. 9. When the electronic first curtain and mechanical second curtain are driven under the same conditions, exposure using the lens 601 with zero amount of shift takes a longer time than exposure using the lens 601' in the region with the slit width D2. Therefore, if the reset scanning pattern of the electronic first curtain is set such that the lens 501 can obtain correct exposure, underexposure occurs at the end of opening of the shutter upon photography by the lens 601' with a large amount of shift.

A case in which the exposure time is prolonged, that is, the shutter speed is slowed down to reduce the above-described unevenness of exposure will be explained with reference to FIGS. 11 and 12.

Figure 11:
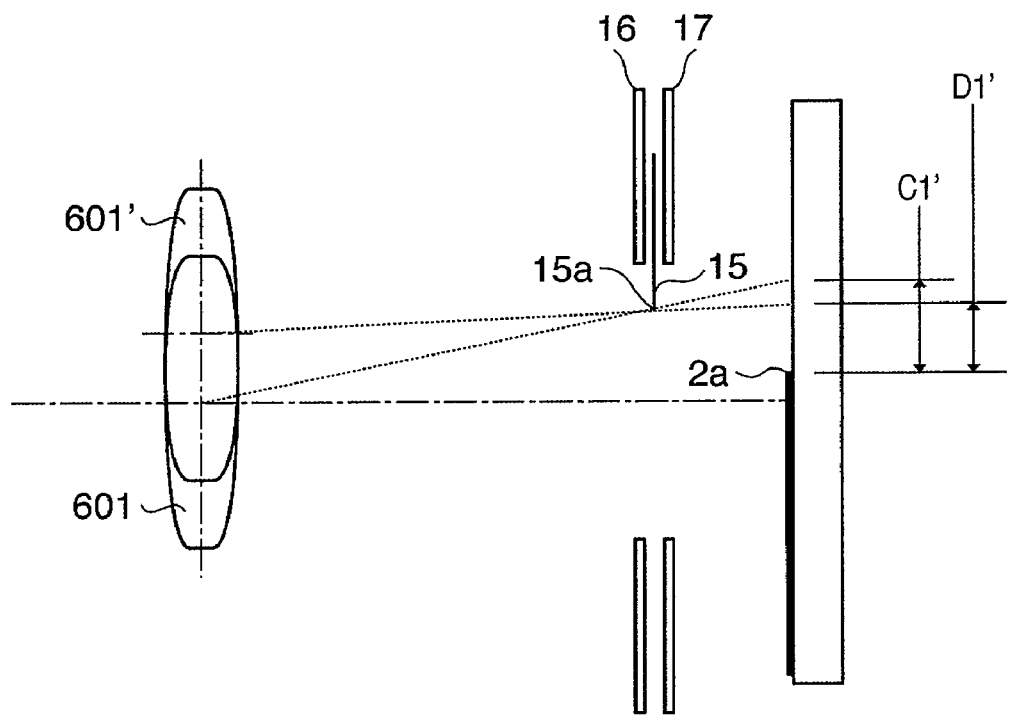
FIG. 11 is a view showing still another relationship among the mechanical second curtain, the electronic first curtain, and the amount of shift of the shift lens.
Figure 12:
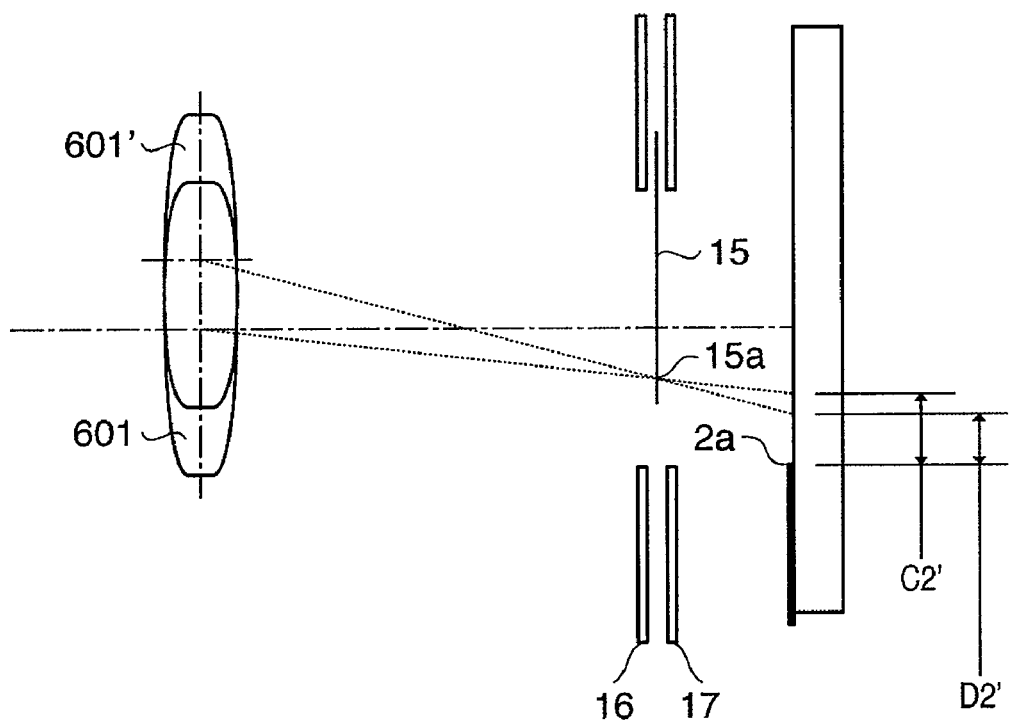
FIG. 12 is a view showing still another relationship among the mechanical second curtain, the electronic first curtain, and the amount of shift of the shift lens.

The same reference numerals as in FIGS. 9 and 10 denote the corresponding members in FIGS. 11 and 12.

Referring to FIG. 11, a slit width C1' corresponding to a lens 601 with zero amount of shift is about twice the slit width C1 shown in FIG. 9. A slit width D1' corresponding to a lens 601' with a large amount of shift is shorter than the slit width C1' with zero amount of shift, but the difference between the slit widths C1' and D1' is very small as compared with that between the slit widths C1 and D1 shown in FIG. 9.

Likewise, referring to FIG. 12, a slit width C2' corresponding to a lens 601 with zero amount of shift is about twice the slit width C2 shown in FIG. 10. A slit width D2' corresponding to a lens 601' with a large amount of shift is shorter than the slit width C2' with zero amount of shift, but the difference between the slit widths C2' and D2' is very small as compared with that between the slit widths C2 and D2 shown in FIG. 10.

Even when a shift lens is used, slowing down the shutter speed reduces unevenness of exposure due to the difference in pupil position as in the case described with reference to FIGS. 5 and 6.

OPERATION SEQUENCE

Third Embodiment

Maximum shutter speed changing processing corresponding to the lens conditions according to the third embodiment will be explained with reference to the sequence illustrated in FIG. 13.

Figure 13:
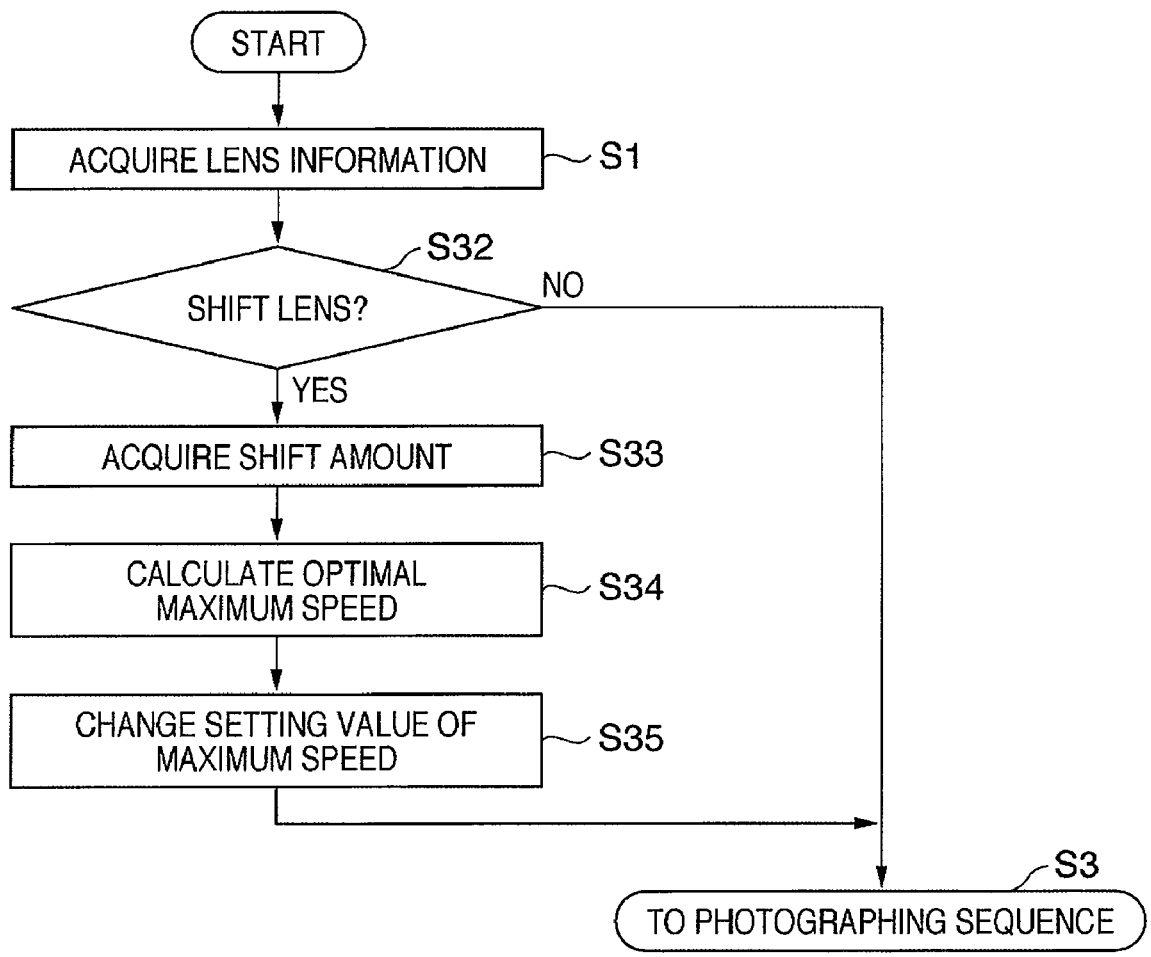
FIG. 13 is a flowchart illustrating exposure time changing processing corresponding to the lens conditions according to the third embodiment.

The same reference signs as in FIG. 7 denote the corresponding processing operations in FIG. 13.

In the third embodiment, if a camera control circuit 5 determines in step S32 that a lens main body 50 is a shift lens, it acquires the amount of shift from the lens main body 50 (S33).

The camera control circuit 5 calculates an optimal maximum shutter speed from the amount of shift acquired in step S33 (S34). In this case, the maximum shutter speed is slowed down in accordance with the magnitude of the amount of shift.

The camera control circuit 5 changes the setting value of the maximum speed to the one calculated in step S34, and the processing shifts to the photographing sequence (S3) (S35).

According to the third embodiment, when a shift lens is mounted on the apparatus, it is possible to determine and set an optimal maximum shutter speed from the amount of shift. This makes it possible to obtain an image with correct exposure even when a shift lens is used for an electronic first curtain.

OPERATION SEQUENCE

Fourth Embodiment

Shutter switching processing corresponding to the lens conditions according to the fourth embodiment will be explained with reference to the sequence illustrated in FIG. 14.

The same reference signs as in FIG. 13 denote the corresponding processing operations in FIG. 14.

The fourth embodiment is different from the third embodiment in the following points. That is, if a camera control circuit 5 determines in steps S32 and S44 that a lens main body 50 is a shift lens (S32) and has an amount of shift equal to or larger than a predetermined value (S44), switching is performed from an electronic first curtain to the first curtain of a mechanical shutter in step S45. If the camera control circuit 5 determines in step S44 that the amount of shift is smaller than the predetermined value, the electronic first curtain is maintained in step S46. The mechanical shutter has no error as in the electronic first curtain. Hence, even when a shift lens is mounted on the apparatus, it is possible to obtain an image with correct exposure by switching to the first curtain of the mechanical shutter if the amount of shift is equal to or larger than the predetermined value.

If a device to change the lens pupil position or an extension tube is absent, switching may be performed to the first curtain of the mechanical shutter as in the case in which a shift lens is mounted on the apparatus.

The object of the present invention is also achieved by the following method. A storage medium (or recording medium) which stores software program codes for implementing the functions of the above-described embodiments is supplied to a camera. In this case, the computer (or CPU or MPU) of the camera reads out and executes the program codes from the storage medium.

When the present invention is applied to the above-described storage medium, it stores various tables and control programs for executing the processing operations of the flowcharts illustrated in FIGS. 7, 8, 13 and 14 described above. These program codes can be provided even as, for example, updateable firmware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-149644, filed Jun. 5, 2007, which is hereby incorporated by reference herein in its entirety.

What is claimed is:

1. An image sensing apparatus comprising:
an image sensing unit having one or more image sensing regions adapted to receive an object image via a lens unit detachably connected to the apparatus and accumulate the received image as an electric charge;
a mechanical shutter unit adapted to travel so as to shield the one or more image sensing regions against light;
a scanning unit adapted to perform scanning for sequentially starting the accumulation of the electric charge for each one or more image sensing regions of said image sensing unit;
a controller adapted to control the scanning of said scanning unit and said mechanical shutter unit; and
a changing unit adapted to change a settable minimum exposure time on the basis of the type of the connected lens unit; and
wherein said changing unit makes the settable minimum exposure time longer in the case that the connected lens unit is a type of which information on a pupil position of the connected lens is not obtainable by the apparatus rather than the case that the information is obtainable.

2. A control method for an image sensing apparatus which comprises:
an image sensing unit adapted to receive an object image via a lens unit detachably connected to the apparatus and accumulate the received image as an electric charge;
a mechanical shutter unit adapted to travel so as to shield an image sensing region of the image sensing unit against light;
a scanning unit adapted to perform scanning for sequentially starting the accumulation of the electric charge for each image sensing region of the image sensing unit; and
a control unit adapted to control the accumulation start scanning of the scanning unit and the travel of a shutter of the mechanical shutter unit, the method comprising:
changing a settable minimum exposure time on the basis of the type of the connected lens unit; and
wherein said changing makes the settable minimum exposure time longer in the case that the connected lens unit is a type of which information on a pupil position of the connected lens is not obtainable by the apparatus rather than the case that the information is obtainable.

3. An image sensing apparatus comprising:
an image sensing unit having one or more image sensing regions adapted to receive an object image via a lens unit detachably connected to the apparatus and accumulate the received image as an electric charge;
a mechanical shutter unit adapted to travel so as to shield the one or more image sensing regions against light;
a scanning unit adapted to perform scanning for sequentially starting the accumulation of the electric charge for each one or more image sensing regions of said image sensing unit;
a controller adapted to control the scanning of said scanning unit and said mechanical shutter unit; and
a changing unit adapted to change a settable minimum exposure time on the basis of the type of the connected lens unit; and
wherein said changing unit makes the settable minimum exposure time longer in the case that the connected lens unit does not have a device which changes information on a pupil position of the connected lens unit rather than the case that the connected lens unit has the device.

4. An image sensing apparatus comprising:
an image sensing unit having one or more image sensing regions adapted to receive an object image via a lens unit detachably connected to the apparatus and accumulate the received image as an electric charge;
a mechanical shutter unit adapted to travel so as to shield the one or more image sensing regions against light;
a scanning unit adapted to perform scanning for sequentially starting the accumulation of the electric charge for each one or more image sensing regions of said image sensing unit;
a controller adapted to control the scanning of said scanning unit and said mechanical shutter unit; and
a changing unit adapted to change a settable minimum exposure time on the basis of information on the connected lens unit,
wherein said changing unit makes the settable minimum exposure time longer in the case that information on a pupil position of the connected lens is not obtainable by the apparatus rather than the case that the information is obtainable.

5. An image sensing apparatus comprising:
an image sensing unit having one or more image sensing regions adapted to receive an object image via a lens unit detachably connected to the apparatus and accumulate the received image as an electric charge;
a mechanical shutter unit adapted to travel so as to shield the one or more image sensing regions against light;
a scanning unit adapted to perform scanning for sequentially starting the accumulation of the electric charge for each one or more image sensing regions of said image sensing unit;
a controller adapted to control the scanning of said scanning unit and said mechanical shutter unit; and
a changing unit adapted to change a settable minimum exposure time on the basis of information on the connected lens unit,
wherein said changing unit makes the settable minimum exposure time longer in the case that the connected lens unit is connected to the apparatus without an extension tube rather than the case that the connected lens unit is connected to the apparatus via the extension tube.

6. A control method for an image sensing apparatus which comprises:
an image sensing unit having one or more image sensing regions adapted to receive an object image via a lens unit detachably connected to the apparatus and accumulate the received image as an electric charge;
a mechanical shutter unit adapted to travel so as to shield the one or more image sensing regions against light;
a scanning unit adapted to perform scanning for sequentially starting the accumulation of the electric charge for each one or more image sensing regions of said image sensing unit; and
a controller adapted to control the scanning of said scanning unit and said mechanical shutter unit, the method comprising:
changing a settable minimum exposure time on the basis of information on the connected lens unit,
wherein in said changing step, the settable minimum exposure time is changed to be longer in the case that information on a pupil position of the connected lens is not obtainable by the apparatus rather than the case that the information is obtainable.

7. A control method for an image sensing apparatus which comprises:
- an image sensing unit having one or more image sensing regions adapted to receive an object image via a lens unit detachably connected to the apparatus and accumulate the received image as an electric charge;
- a mechanical shutter unit adapted to travel so as to shield the one or more image sensing regions against light;
- a scanning unit adapted to perform scanning for sequentially starting the accumulation of the electric charge for each one or more image sensing regions of said image sensing unit; and
- a controller adapted to control the scanning of said scanning unit and said mechanical shutter unit, the method comprising:
- changing a settable minimum exposure time on the basis of information on the connected lens unit,
- wherein in said changing step, the settable minimum exposure time is changed to be longer in the case that the connected lens unit is connected to the apparatus without an extension tube rather than the case that the connected lens unit is connected to the apparatus via the extension tube.

8. A control method for an image sensing apparatus which comprises:
- an image sensing unit having one or more image sensing regions adapted to receive an object image via a lens unit detachably connected to the apparatus and accumulate the received image as an electric charge;
- a mechanical shutter unit adapted to travel so as to shield the one or more image sensing regions against light;
- a scanning unit adapted to perform scanning for sequentially starting the accumulation of the electric charge for each one or more image sensing regions of said image sensing unit;
- a controller adapted to control the scanning of said scanning unit and said mechanical shutter unit, the method comprising:
- changing a settable minimum exposure time on the basis of the type of the connected lens unit; and
- wherein said changing makes the settable minimum exposure time longer in the case that the connected lens unit does not have a device which changes information on a pupil position of the connected lens unit rather than the case that the connected lens unit has the device.

* * * * *